United States Patent
Dahlen (10) Patent No.: US 8,547,668 B2
(45) Date of Patent: Oct. 1, 2013

(54) MANAGEMENT TECHNIQUES FOR ELECTRIC POWER GENERATION EQUIPMENT

(75) Inventor: Paul R. Dahlen, Grant, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 315 days.

(21) Appl. No.: 12/914,517

(22) Filed: Oct. 28, 2010

(65) Prior Publication Data

US 2011/0148214 A1 Jun. 23, 2011

Related U.S. Application Data

(60) Provisional application No. 61/279,946, filed on Oct. 28, 2009.

(51) Int. Cl.
*H02H 7/06* (2006.01)
*H02H 3/00* (2006.01)

(52) U.S. Cl.
USPC ............................................. 361/20; 307/84

(58) Field of Classification Search
USPC ............................................. 361/20; 307/84
See application file for complete search history.

(56) References Cited

U.S. PATENT DOCUMENTS

| | | | |
|---|---|---|---|
| 5,390,068 A * | 2/1995 | Schultz et al. | 361/95 |
| 6,104,171 A | 8/2000 | Dvorsky et al. | |
| 6,194,794 B1 | 2/2001 | Lampe et al. | |
| 6,639,331 B2 | 10/2003 | Schultz | |
| 2008/0179959 A1 | 7/2008 | Folken et al. | |
| 2010/0156191 A1* | 6/2010 | Dozier et al. | 307/81 |

OTHER PUBLICATIONS

International Search Report and Written Opinion, PCT/US2010/054517, Cummins Power Generation IP, Inc., et al., The International Searching Authority/US, Oct. 28, 2010.

\* cited by examiner

*Primary Examiner* — Scott Bauer
(74) *Attorney, Agent, or Firm* — Krieg DeVault LLP (57) ABSTRACT

A method for controlling power generation equipment, including bringing a generator online into a shared power bus environment, is described. The method includes determining whether the shared power bus is currently active, and whether a voltage determination fault is present with respect to a specific generator. Where the shared power bus is inactive and no fault is present, the generator is brought online in response to a load request. Where the shared power bus is active, the generator is synchronized with the shared power bus before the generator is brought online.

23 Claims, 8 Drawing Sheets

MANAGEMENT TECHNIQUES FOR ELECTRIC POWER GENERATION EQUIPMENT

CROSS REFERENCE TO RELATED APPLICATIONS

The present application claims the benefit of U.S. Provisional Patent Application No. 61/279,946 filed on Oct. 28, 2009, and the same is herein incorporated by reference in its entirety.

FIELD OF THE INVENTION

The present application is directed to control systems, and more particularly, but not exclusively, to a redundant way to determine the status of an electric power bus.

BACKGROUND

In a system of multiple parallel generators, each generator has its own generator paralleling breaker which is used to connect it to a common bus so that it can provide power to the electrical load. When there is no power on the bus, only generator is allowed to close its breaker to connect to the bus. Once that generator has closed its breaker, the bus becomes live and the remaining generators typically synchronize output voltage, frequency, and phase to match that of the bus before closing each respective breaker.

The automatic closing of a generator paralleling breaker to a dead bus requires the control system to know that the bus lacks power. One approach is to determine if there is voltage on the bus. If there is no voltage, the bus is dead.

However, the bus will appear to be dead if the voltage sensing circuit is open or shorted. Should the control system sense the bus as being dead, but in actuality it is live, closing the generator breaker to the bus without synchronizing the output voltage, frequency, and phase may result in generator damage. This damage may include failed generator rotating rectifiers or failed surge suppressors. At a minimum, closing a generator to a bus without synchronization will stress the generator and may shorten generator life.

With current designs, incorrect sensing of a dead bus has various sources. Incorrect sensing of a dead bus can be caused by wiring connections which have not been made, are broken, or were disconnected inadvertently or intentionally during servicing or testing procedures. Incorrect sensing can also be caused by open fuses in the bus voltage sensing circuit, or a disconnected bus sensing transformer. One of the most common causes of failure of bus voltage sensing is human error during commissioning or servicing of the generator system.

Thus, there is an ongoing need for further contributions in this area of technology. The various embodiments of the present application provide such contributions.

SUMMARY

One embodiment is a unique method for determining a generator fault and for bringing a generator online in a common power bus environment. Further embodiments, forms, objects, features, advantages, aspects, and benefits shall become apparent from the following description and drawings.

DETAILED DESCRIPTION OF REPRESENTATIVE EMBODIMENTS

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments and any further applications of the principles of the invention as described herein are contemplated as would normally occur to one skilled in the art to which the invention relates.

Figure 1:
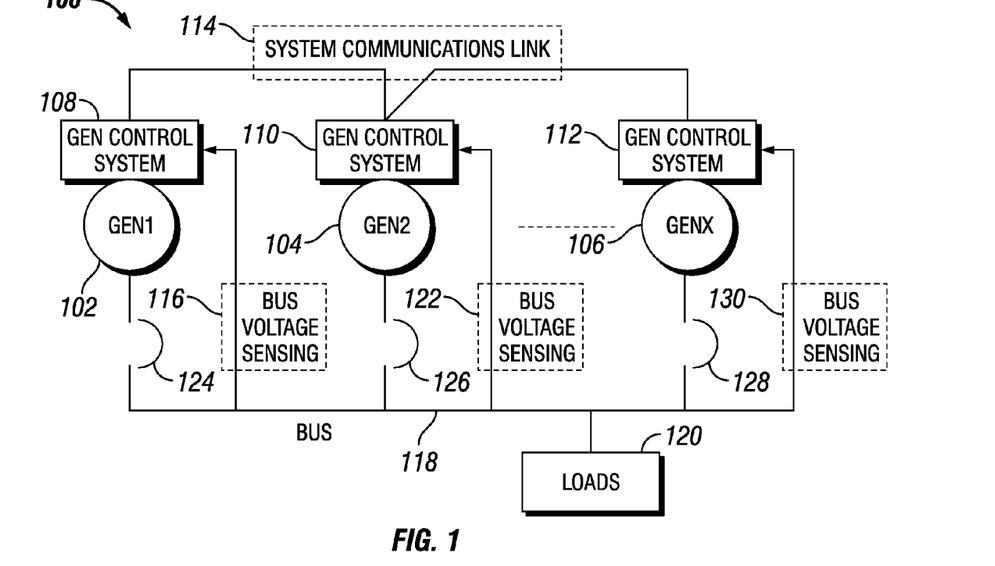
FIG. 1 depicts a system communications link.

In one embodiment of the present application, a control system (controller 108) uses a further detection technique in addition to bus voltage detection 116, to validate the status of the bus (live/dead) 118. In control systems having load sharing lines 118 connected between generators 102, 104, 106, the control system 108 will test the status of the load sharing lines 118 to determine if other generators 104, 106 are closed to the bus (are online) 118. If the control system 108 formula determines that other generators 104, 106 are online, the bus 118 still has electrical current flowing through it to a load 120, although the bus voltage sensor 116 indicates a dead bus 118 is present. A fault is declared where other generators are online yet the voltage sensor 116 indicates that the bus 118 is dead. The generator 102 is unable to close its breaker 124 until the aforementioned condition, i.e. determining other generators 104, 106 are online yet the bus voltage sensor 116 indicates a dead bus 118, has been corrected. In a further embodiment of the present application, control systems (controllers 108, 110, 112) having a communications network 114 connected between generators 102, 104, 106 will monitor the bus status of other generators 102, 104, 106. In this embodiment, if all generators 102, 104, 106 do not make the same determination that the bus 118 is dead, the control system will declare a fault and the genset 102 will not close its breaker to the potentially dead bus 118 until the condition has been corrected.

In another embodiment of the present application, a load sharing communications link 114 between generators 102, 104, 106 is provided. The load sharing communications link 114 is utilized to determine the bus status for a multiple generator system 100. In this embodiment, when a first generator 102 senses that the voltage to a bus 118 is dead and is ready to close its breaker 124 to the dead bus 118, a first control system 108 for the first generator 102 puts test signals onto the load sharing communications lines 114. If the signals received by the first control system 108 are the same as the test signals sent onto the load sharing communications lines 114, no other generator 104, 106 has closed its generator paralleling breaker 124, 126, 128 and the bus 118 is confirmed as dead. Following confirmation that the bus 118 is dead, the first generator 102 closes its generator paralleling breaker 124. If the signals received by the first control system 108 are not the same as the test signals sent by the first control system 108, another generator 104, 106 has closed its generator paralleling breaker 126, 128 and the first generator 102 is prohibited from closing its generator paralleling breaker 124. In a further embodiment, a fault is communicated to an operator when the signals received by the first control system 108 are not the same as the test signals sent.

In another embodiment of the present application, a digital communications link 114 between generators 102, 104, 106 is provided. In this embodiment, the generator control systems 108, 110, 112 communicate respective generator paralleling breaker positions and the status of the bus voltage (live/dead). For a first generator 102 to close its generator paralleling breaker 124, all other generators 104, 106 in the system 100 indicate that the bus 118 is dead. In a further embodiment of the present application, for a first generator 102 to close its generator paralleling breaker 124, all other generators 104, 106 in the system indicate that the corresponding generator paralleling breakers 126, 128 are open and that the bus 118 is dead. In yet a further embodiment, a fault is communicated to an operator when all other generators 104, 106 do not indicate that the bus 118 is dead or do not indicate that corresponding breakers 126, 128 are open.

In a further embodiment of the present application, once a generator 102, 104 closes the generator paralleling breaker 124, 126, the control system 108 verifies that there is live voltage through the bus utilizing a voltage sensor 116, 122, 130. A fault is communicated to an operator if a generator 102, 104 closes its generator paralleling breaker 124, 126 and the control system 108, 110 identifies that there is not live voltage through the bus 118.

In the aforementioned embodiments, when a generator 102, 104, 106 determines there is a live bus 118, it is able to synchronize its output voltage, frequency, and phase to match that of the bus and is then able to close its breaker 124, 126, 128 to the live bus. Closing the breaker of a generator 102, 104, 106 after synchronization enables multiple generators to provide power to the load(s) 120.

FIG. 1 depicts the diagram of a system communications link 114 of a further embodiment of the present application. In one form, the system communications link 114 includes only load sharing signals (analog). When one generator 102, 104, 106 in FIG. 1 senses that the bus 118 is dead and is ready to close its generator paralleling breaker 124, 126, 128 to the dead bus 118, the generator control system 108, 110, 112 sends test signals onto the load sharing lines. If the signals received by the generator control system 108, 110, 112 are the same signals that were sent by the generator control system 108, 110, 112, the status of the bus is confirmed as dead 118 and the generator will close its breaker.

In another embodiment of the present application, the system communications link 114 includes a digital communications protocol. This digital communications protocol allows each generator control system 108, 110, 112 to share more information than just load sharing data. The digital communications protocol may be any type of communications protocol understood in the art, including without limitation a public datalink, private datalink, proprietary datalink, and/or an industry standardized datalink. In certain embodiments, one or more generator control systems 108, 110, 112 or portions thereof may be shared within a hardware device, and certain communications from the system communications link 114 may be passed as software parameters and/or memory location references rather than as datalink parameters. The communications between the generator control systems 108, 110, 112 may use any type of electronic communications understood in the art. A generator 102, 104, 106 will close its generator paralleling breaker 124, 126, 128 when all other generators in the system 100 communicate that the bus 118 is dead and that the respective breakers of each generator are open.

In a further embodiment, after a generator 102, 104, 106 verifies that a bus 118 is dead and closes its generator paralleling breaker 124, 126, 128, the control system 108, 110, 112 of the generator verifies that there is live voltage across the bus 118 using a bus voltage sensor 116, 122, 130.

Figure 2:
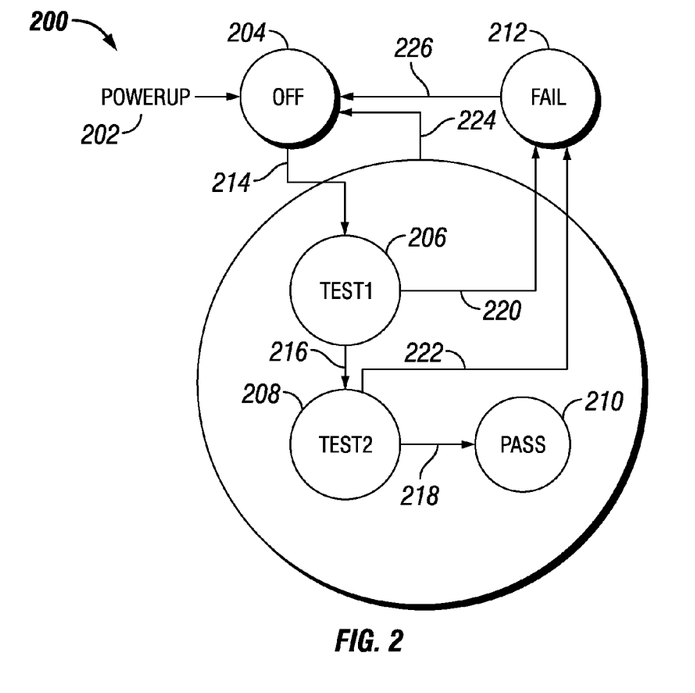
FIG. 2 depicts a bus sensing test state machine.
Figure 3:
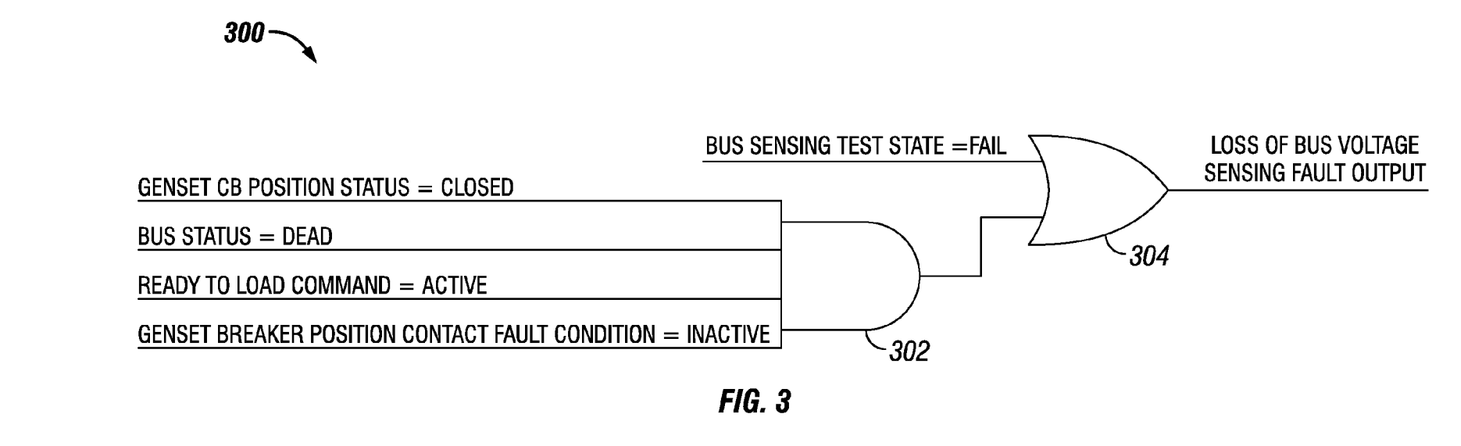
FIG. 3 depicts logic for determining a bus voltage sensing fault.

The descriptions referencing FIGS. 2 through 7 following refer to exemplary operations corresponding to certain embodiments of the present invention, and are non-limiting. FIG. 2 schematically depicts a bus sensing test state machine 200 for one embodiment of the present application. FIG. 3 schematically depicts the bus sensing state actions 300 in terms of binary combinatorial logic gates.

In an embodiment of the present application, a loss of bus voltage sensing algorithm is utilized to detect an open circuit condition in all 3 phases of bus voltage sensing. This algorithm is utilized for applications where the bus voltage sensing is connected to the genset bus such as in genset application types like isolated bus only or utility multiple. The algorithm will operate by performing a test on the kilowatt (kW) load share line to determine whether or not there are other gensets online. This test only slightly delays the dead bus closure. In a further embodiment of the present application, in which there is load sharing through both voltage and speed droop, the algorithm will not detect the open circuit bus voltage sensing conditions.

When the loss of bus voltage sensing is being determined and the genset application type is an isolated bus only or utility multiple, an exemplary execution rate for the algorithm is 50 Hertz (Hz). Upon power-up the bus sensing test state is set to an off position and the loss of bus voltage sensing fault condition is initialized to inactive. If the overall process is enabled (process enable is deemed true), the bus sensing test state and loss of bus voltage sensing fault condition, schematically represented in FIGS. 2 and 3, are processed. If the overall process is not enabled, the bus sensing state is PASS and the loss of bus voltage sensing fault condition is inactive.

Further referencing FIGS. 2 and 3, after initial power-up 202, the generator is offline from the rest of the system 100 and an OFF state 204 is reached. In the OFF state 204, the test load share command equals 0%. During transition 214 the generator senses that the bus is in a nonoperational state and commences an operation to determine whether to close its breaker to the bus. TEST1 state 206 is then reached, wherein an exemplary test timer is set to equal 160 ms, the test load share command equals 0%, and the decrement test timer clamp is at a 0 position. During the operation for transition 216, the test timer is set equal to 0 and the relationship in Inequality 1 is satisfied.

Inequality 1: $-10\% < (\text{kW Load Share Level} - \text{Load Share kW AutoCal Offset}) < +10\%$ The kW Load Share Level comes from analog signal inputs (ASI). The Load Share kW AutoCal Offset comes from paralleling control (PCTL). If the transition 216 function is not satisfied, the state machine 200 proceeds to transition 220 and the FAIL state 212 is reached. If the transition 216 function is satisfied, the TEST2 state 208 is reached. In the TEST2 state 208, an exemplary test timer is set equal to 160 msec, the test load share command equals 100%, and the decrement test timer clamp is at a 0 position. During the operation for transition 218, the test timer is set equal to 0 and the relationship in Inequality 2. is satisfied.

Inequality 2: 90%<(kW Load Share Level−Load Share kW AutoCal Offset)<110%

If the transition 218 function is not satisfied, the state machine 200 proceeds to transition 222 and the FAIL state 212 is reached. If the transition 218 function is satisfied, the state machine 200 proceeds to transition 218 and the PASS state 210 is reached. In the PASS state 210, the test load share command equals 0%. In the FAIL state 212, test load share command equals 0%. Once the FAIL state 212 has been reached, the state machine 200 proceeds to transition 226 and the fault reset command is active. The transition 226 results in the OFF state 204 being reached. During any of the TEST states 206, 208, 210, if the dead bus generator circuit breaker close request goes inactive, the state machine 200 proceeds to transition 224 and the OFF state 204 is reached.

Referencing FIG. 3, if the loss of bus voltage sensing fault output is inactive, the loss of bus voltage sensing fault condition is also inactive. If the loss of bus voltage sensing fault output is active continuously for one second, the loss of bus voltage sensing fault condition is active.

A dead bus closing function implements logic to determine whether a controller should close the genset circuit breaker onto a bus which is in a nonoperational state. This dead bus determination can be made by looking at bus voltage, except in the case of a utility single whereby dead bus is inferred by genset and utility breaker positions. When setup conditions are met, permission from a first start state machine precedes any other operations that occur. If permission is granted, the genset breaker is closed. If the first start state machine does not provide permission within a fixed amount of time, the controller will close the genset breaker anyway and generate a first start backup diagnostic event providing continued functioning of the system in the event of a failure in the first start function. Multiple gensets each have its respective first start backup time set to different values to prevent the possibility of two or more gensets closing to a dead bus at the same time. This function is disabled for power transfer controller (PTC) applications.

As illustrated in the schematic 300 of FIG. 3, the OR gate 304 enforces the loss of bus voltage sensing fault output if the bus sensing test state is FAIL (e.g. state machine 200 at FAIL state 212). Additionally, if all of the conditions present at AND gate 302 are met, the loss of bus voltage sensing fault output is likewise enforced. The conditions illustrate at AND gate 302 include the genset circuit breaker indicates that it is closed, the common bus indicates zero voltage (dead), the ready to load command is active, and the genset breaker position contact fault condition is inactive.

Figure 4:
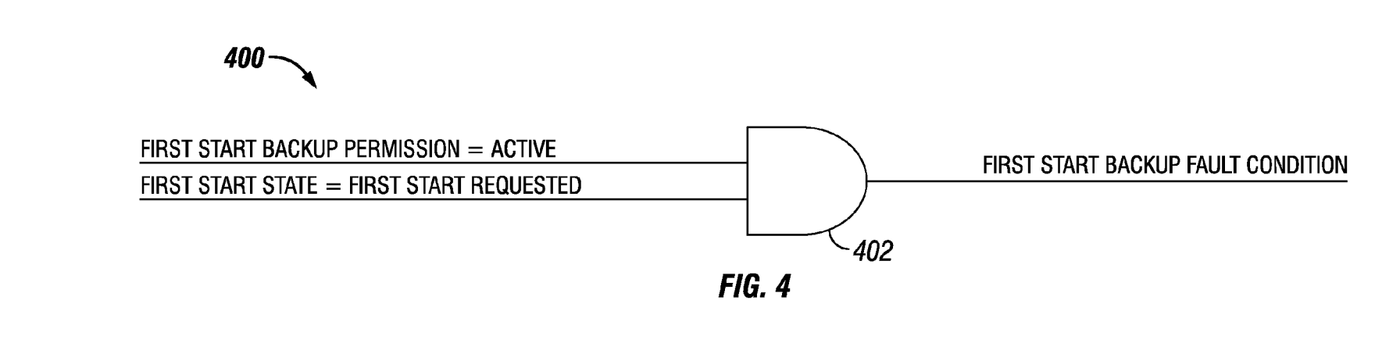
FIG. 4 depicts logic for determining a first start backup fault.
Figure 5A:
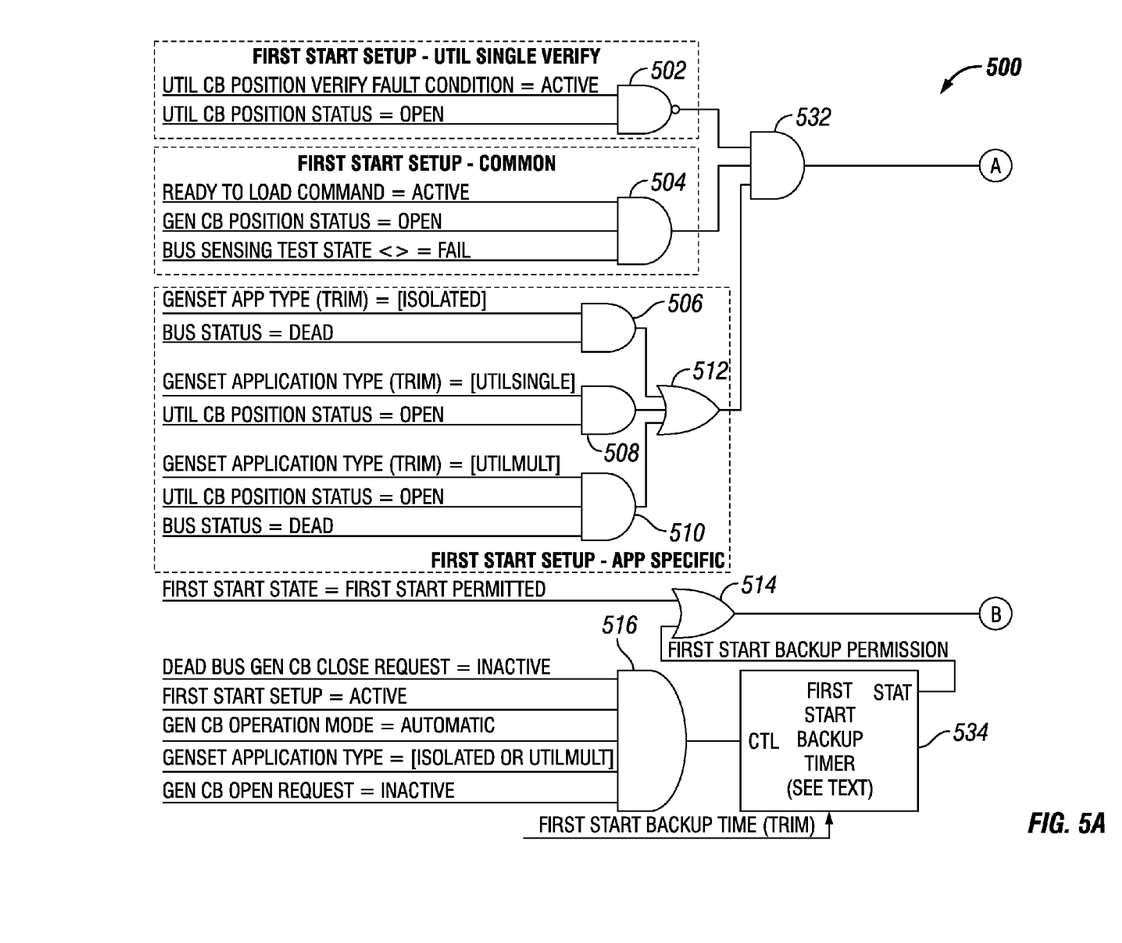
FIG. 5A is a first portion depicting logic for determining a power bus is dead, and electrically coupling a generator to the power bus.
Figure 5B:
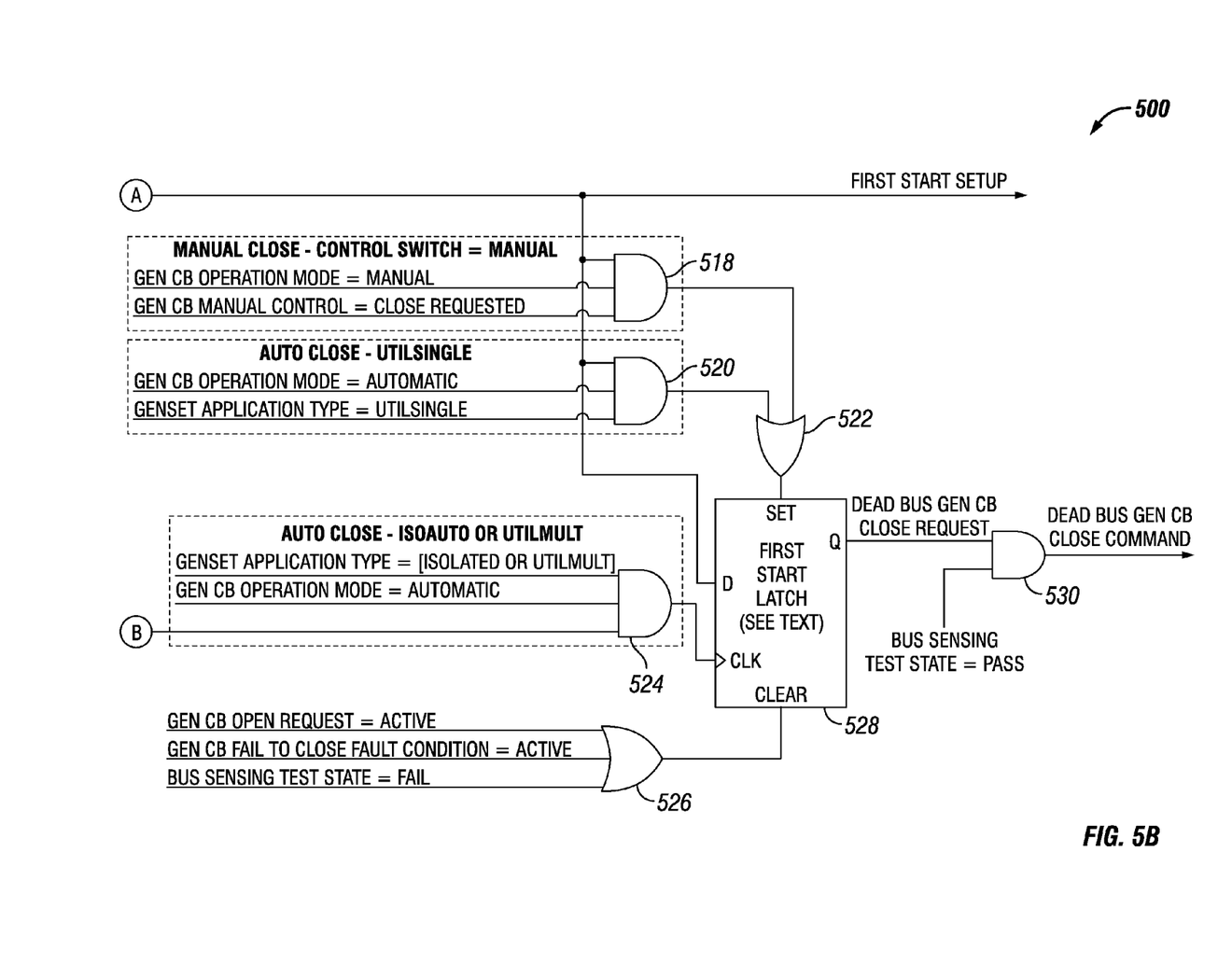
FIG. 5B is a second portion depicting logic for determining a power bus is dead, and electrically coupling a generator to the power bus.

FIG. 4 is a schematic 400 of a logic gate (AND gate 402), depicting logic to a first start backup fault condition of a generator. FIGS. 5A and 5B are a schematic drawing of a logic gate representation of a dead bus closing logic diagram.

A determination of the genset type is to be made: isolated, utility single, or utility multiple. The execution rate utilized is 50 Hz. Upon power-up or if the process is not executed, the process outputs shall be set to inactive states, or as noted in FIG. 4 and FIG. 5. The dead bus closing function 500 is processed as shown in FIG. 5. In FIG. 5, the First Start Latch function 528 operates as follows: if CLEAR is equal to '0' (OR gate 526 output=TRUE) and SET is equal to '0' (OR gate 522 output=TRUE) and Q is equal to '0', then Q is equal to D (AND gate 532 output) whenever the CLK input (AND gate 524 output) makes a transition from '0' to '1'; if CLEAR is equal to 0 and SET is equal to '1' then Q is equal to '1'; if CLEAR is equal to 1 then Q is equal to '0'; if Q is equal to '1' then Q is equal to '0' only if CLEAR is equal to '1'. All inputs are ignored except CLEAR once the latch output Q is equal to '1'.

Regarding the FIRST START BACKUP TIMER 534, shown in FIG. 5, the timer 534 runs when control (Ctl) input (AND gate 516 output) is logic '1' (or TRUE) and the timer 534 is halted and cleared when the Ctl input is logic '0' (or FALSE). The Stat output is active when the timer reaches First Start Backup Time. The First Start Backup Fault Condition is processed as shown in FIG. 4.

The AND gate 532 combines the outputs of NAND gate 502, AND gate 504, and OR gate 512 as shown. The OR gate 512 output is provided from AND gate 506, AND gate 508, and AND gate 510 as illustrated in FIG. 5A. OR gate 522 receives the output of AND gate 518 and AND gate 520. AND gate 524 receives, in addition to the illustrated parameter values, the output of OR gate 514. OR gate 526 receives the illustrated parameters in FIG. 5B. AND gate 530 receives the output of First Start Latch function 528 and the bus sensing test state value (e.g. PASS or FAIL), for example as provided by state machine 200.

The load share function manages the kW and kilovolt-ampere-reactance (kVAR) production of the genset when it is connected to a common bus with other gensets (while isolated from the utility bus). Each genset must determine how much of the total load of the bus to provide. The desired result is for each genset to take its equal share of the load relative to its own rating while maintaining the bus frequency and voltage at the nominal values (i.e. each would end up taking the same % load). Sharing of kW is controlled by fuel (e.g. speed). Sharing of kVAR is controlled by excitation (e.g. voltage).

In order to share load while maintaining fixed frequency and voltage, some form of communication between the gensets must occur. (The other option with no communication is speed and voltage droop). This is accomplished through the "load share lines". There is a pair for kW and a pair for kVAR. Each genset drives a current into the common load share line that is proportional to the % kW and % kVAR it is carrying. Through the use of current summing and voltage sensing, each genset can determine what % kW and % kVAR it should carry.

Figure 6:
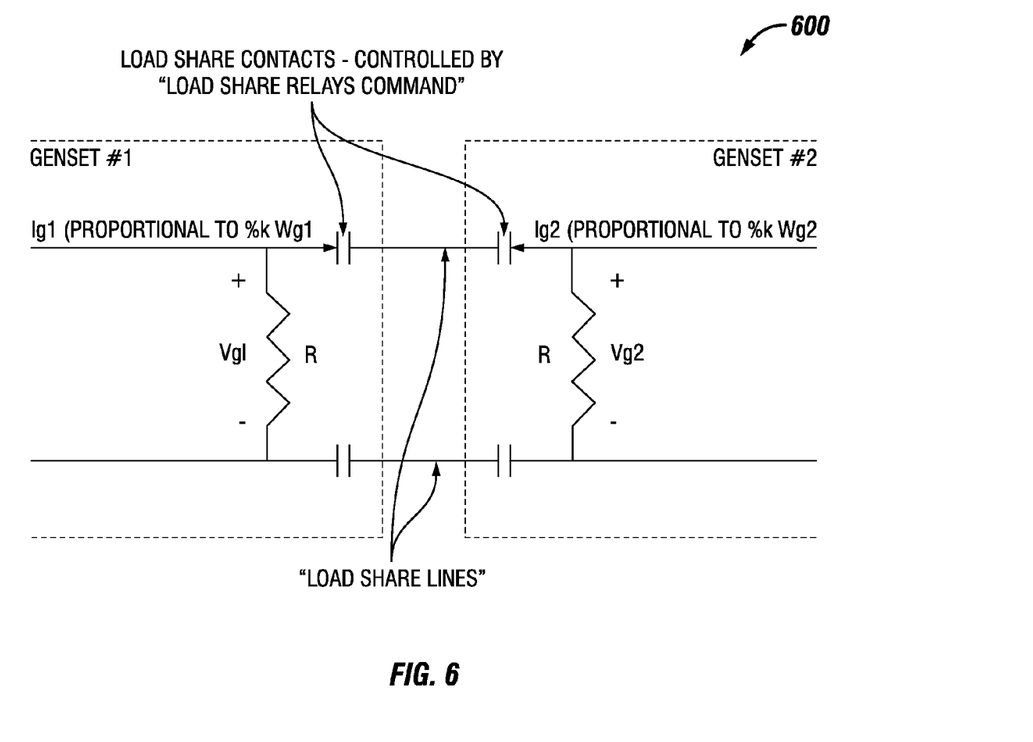
FIG. 6 is a schematic diagram depicting load share hardware for two gensets.

FIG. 6 shows a kW load share basic hardware interface setup (analog) for two gensets. This communication arrangement provides the ability to ramp load on or off the genset in response to a load demand stop/start or a ramp load/unload command. Ramp unloading is accomplished by having genset #1 add a ramped offset to its Ig1, effectively deceiving the system with regards to how much load it is taking. Through this system deception, genset #1 forces the other generators to pick up the slack. This ability improves system transient performance and prolongs breaker life.

Load share functions shall execute continuously. The load share functions are executed as follows: automatic calibration of load share kW and kVAR, load share activate, load share kW power width modulation (PWM) drive. The use of automatic calibration of load share removes any hardware tolerance errors. For the automatic calibration of load share kW and kVAR, the execution rate is set at 50 Hz. During power-up initialization, the load share kW AutoCal offset is 0%. The load share kVAR AutoCal offset is 0%. Software timers are clamped to prevent overflow/underflow. The load share automatic calibration logic is as follows: If the Operator Interface Mode is not equal to the Operator Rated State which is greater than or equal to 400 msec then the formulas of equations 1 and 2 are applied.

$$\text{Load Share kW AutoCal Offset} = (\text{kW Load Share Level} - \text{kW Load Share Output Command}) \quad \text{Eq. 1}$$

$$\text{Load Share kVAR AutoCal Offset} = (\text{kVAR Load share Level} - \text{kVAR Load Share Output Command}) \quad \text{Eq. 2}$$

Both equations are clamped within the range from −3% to +3%. If the Operator Interface Mode is equal to the Operator Rated State, then the values of the AutoCal Offsets are not changed.

The four load share lines of the gensets are connected to the common load sharing bus if a paralleling control mode is in load share. The load share relay should not be closed if both the speed and voltage are operating in droop mode, preventing other gensets that are in isochronous and/or constant voltage from getting their paralleling lines connected to a droop genset. This logic allows selection of which gensets are lead units and which will droop while still allowing those not drooping to operate in the normal load share scheme utilizing the load share lines.

During the load share activate command, the load share relays command functions as follows: If the paralleling speed control mode is equal to the load share or the paralleling voltage control mode is equal to the load share or the bus sensing test state is equal to TEST1 or TEST2 then kW/kVAR load share relay command is active; otherwise, kW/kVAR load share relay command is inactive.

The kW and kVAR load share lines are driven by current sources. The current source output is set by PWM drive. The percent PWM is proportional to the sum of the actual measured kW (or kVAR) plus a load ramping kW (or kVAR) offset if load is being ramped. A balance trim may also be added to the percent PWM to allow for fine tuning in-the-field. The ramp load/unload offset allows a genset to inaccurately state how much power it is producing, thereby forcing other gensets to pick up more load. The conversion to percent PWM is linear with the ability to set an offset which provides the ability to share reverse kW or reverse kVAR.

The load share PWM drive functions are executed continuously, due to an external hardware filter time constant. When the load share activate relay closes, the value that the genset presents on the load share lines must accurately reflect the power the genset is carrying. (E.g. In going from load govern to load share, the genset may have been carrying power in load govern.)

Figure 7:
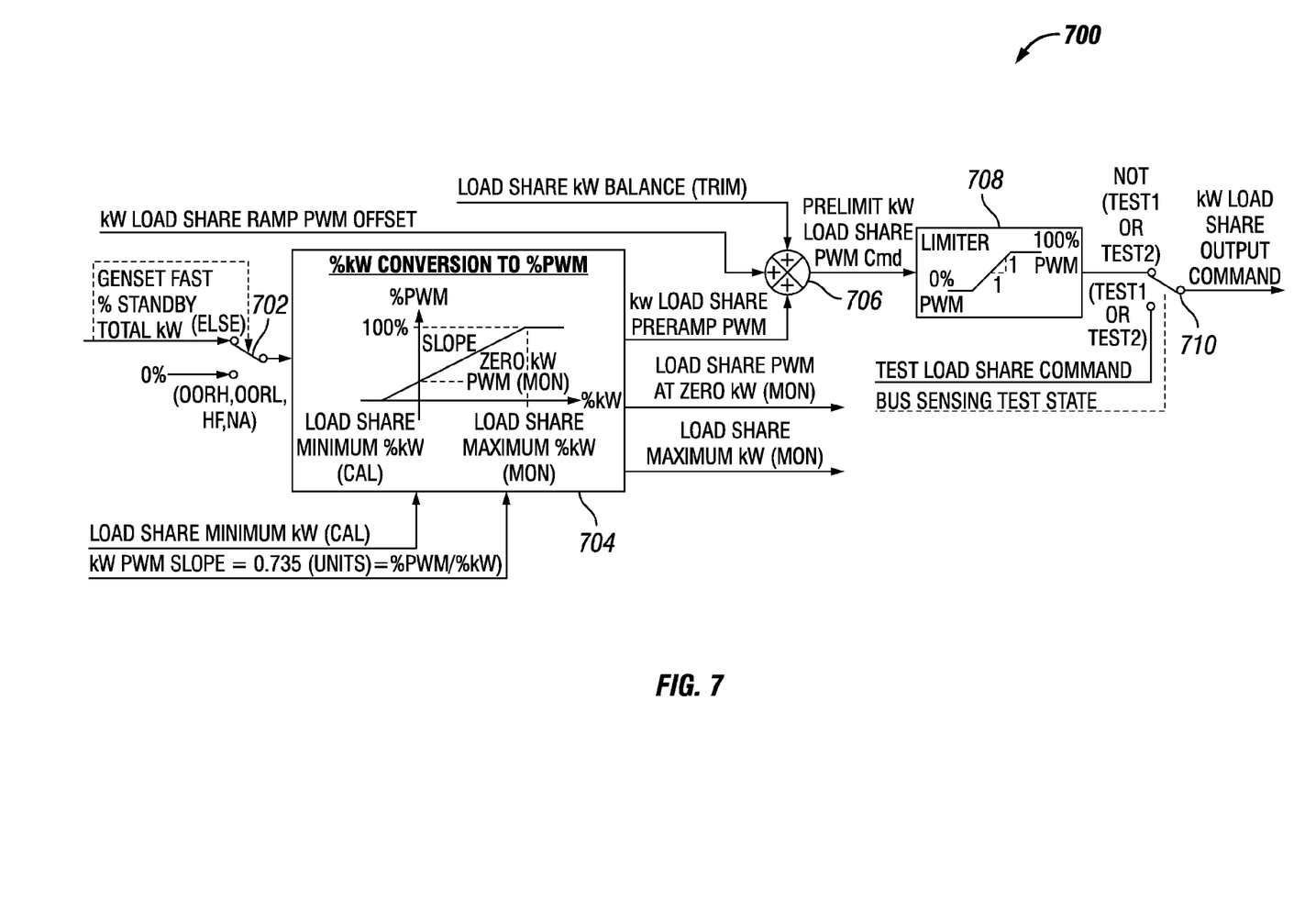
FIG. 7 is a control flow diagram for determining a load sharing command.

The kW load share PWM command level will be generated as shown in FIG. 7, a control flow diagram 700. Referencing FIG. 7, the following will be calculated when the load share minimum kW (trim) is changed:

$$\text{Load Share PWM at zero kW} = -1 * \text{Load Share Minimum kW(cal)} * \text{kW PWM Slope}; \quad \text{Eq. 3}$$

and $$\text{Load Share Maximum kW} = \text{Load Share Minimum kW(trim)} + (100/\text{kW PWM Slope}). \quad \text{Eq. 4}$$

Equation 3 is illustrated at Table 704. The maximum Load Share is provided by conditional switch 702, and is set to 0% in the event of certain fault conditions such as an out of range high, out of range low, etc. and otherwise by the desired maximum load for the genset, e.g. the rated kW output. Per FIG. 7, the following equations should be calculated every execution:

$$\text{kW load share PreRamp PWM} = (\text{kW PWM Slope} * \text{Genset Fast \% Standby Total kW} + \text{Load Share PWM at zero kW}); \text{ and} \quad \text{Eq. 5}$$

$$\text{PreLimit kW Load Share PWM Command (Cmd)} = (\text{kW Load Share PreRamp PWM} + \text{kW Load Share Ramp PWM Offset} + \text{Load Share kW Balance (trim)}) \quad \text{Eq. 6}$$

Equation 6 is illustrated at summation block 706. As described at conditional switch 710, If the bus sensing state is not TEST1 or TEST2 then Equation 7 is utilized as illustrated at Limiter 708. Further at conditional switch 710, if the bus sensing state is TEST1 or TEST2, then the kW Load Share Output Cmd is equal to the Test Load Share Cmd.

$$\text{kW Load Share Output Cmd} = \text{LIMITER (PreLimit kW Load Share PWM Cmd.} \quad \text{Eq. 7}$$

Figure 9:
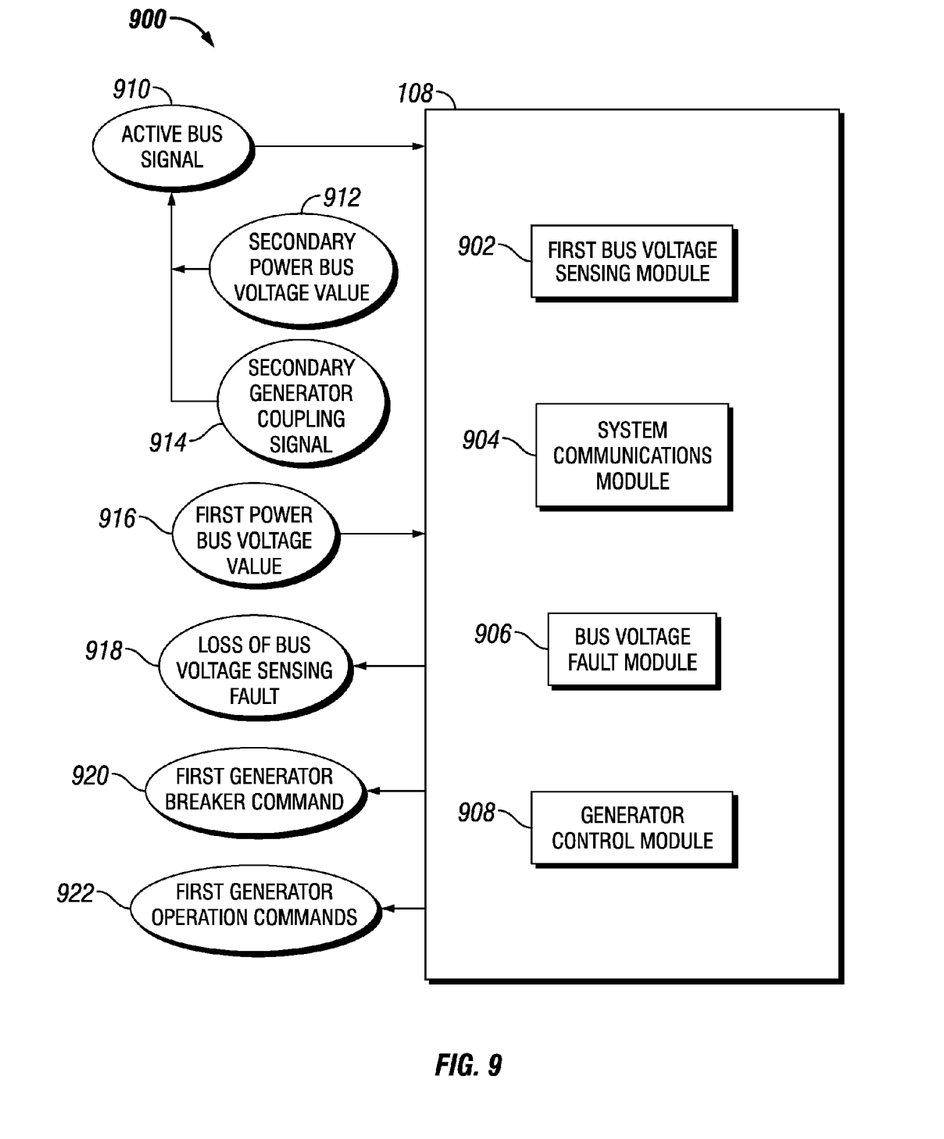
FIG. 9 is a schematic diagram of a procedure for managing electric power generation equipment.

Referencing FIG. 9, an exemplary apparatus 900 including a generator controller 108 is illustrated. In certain embodiments, the controller forms a portion of a processing subsystem including one or more computing devices having memory, processing, and communication hardware. The controller may be a single device or a distributed device, and the functions of the controller may be performed by hardware or software. In certain embodiments, the controller includes one or more modules structured to functionally execute the operations of the controller. The controller 108 includes a first bus voltage sensing module 902, a system communications module 904, a bus voltage fault module 906, and a generator control module 908.

The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components.

The exemplary apparatus 900 includes the first bus voltage sensing module 902 that interprets a first power bus voltage value 916. The first power bus voltage value 916 is any system parameter indicative of voltage on the common power bus, and in one example is provided by a first voltage sensing circuit to the controller 108. The apparatus 900 further includes a system communications module 904 that interprets an active bus signal 910. The active bus signal 910 is any signal in the system that provides an indication of whether voltage is present on the common power bus and that is independent of the information provided by the first power bus voltage value. Exemplary sources for the active bus signal 910 include a secondary power bus voltage value 912, for example as provided by a voltage sensing circuit associated with a different generator than the first generator, and/or a secondary generator coupling signal 914. A secondary generator coupling signal 914 includes a signal indicating that a different generator is presently electrically coupled to the common power bus. The active bus signal 910 may be provided to the system communications module 904 through hardware, software, network or datalink communication, or by any other method understood in the art.

The apparatus 900 further includes a bus voltage fault module 906 that, in response to the first power bus voltage value 916 indicating a power bus voltage value is zero, and in response to the active bus signal 910 indicating the power bus is active, provides a loss of bus voltage sensing fault 918. In certain embodiments, the apparatus 900 further includes a generator control module 908 that, in response to the first power bus voltage value 916 indicating a power bus voltage value is zero and the active bus signal 910 indicating the power bus is inactive, provides a first generator breaker command 920 that electrically couples the first generator to the power bus. The use of a breaker and the first generator breaker command 920 is exemplary only, and the generator control module 908 may electrically couple the first generator to the power bus by any method understood in the art, including at least providing a software request, commanding a solid state switch, and providing an electrical output wherein a device is responsive to the electrical output to electrically couple the first generator to the common power bus in response to the electrical output. A further embodiment of the apparatus 900 includes the generator control module 908, in response to the loss of bus voltage sensing fault 918, further preventing an electrical coupling of the first generator and the power bus.

In certain embodiments, the apparatus 900 includes the generator control module 908, in response to the first power bus voltage value 916 indicating the power bus voltage value is not zero, providing first generator operation commands 922 to synchronize a first generator with the power bus voltage value, and then providing the first generator breaker command 920 to electrically couple the first generator to the power bus. Yet another exemplary apparatus 900 includes the system communications module 904, in response to the loss of bus voltage sensing fault 918, further interpreting a secondary power bus voltage value 912, and the generator control module 908 further providing first generator operation commands 922 to synchronize the first generator output with the secondary power bus voltage value 912. The generator control module 908 then provides the first generator breaker command 920 to electrically couple the first generator to the power bus.

The schematic flow diagram and related description which follows provides an illustrative embodiment of performing procedures for managing electric power generation equipment. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

Figure 8:
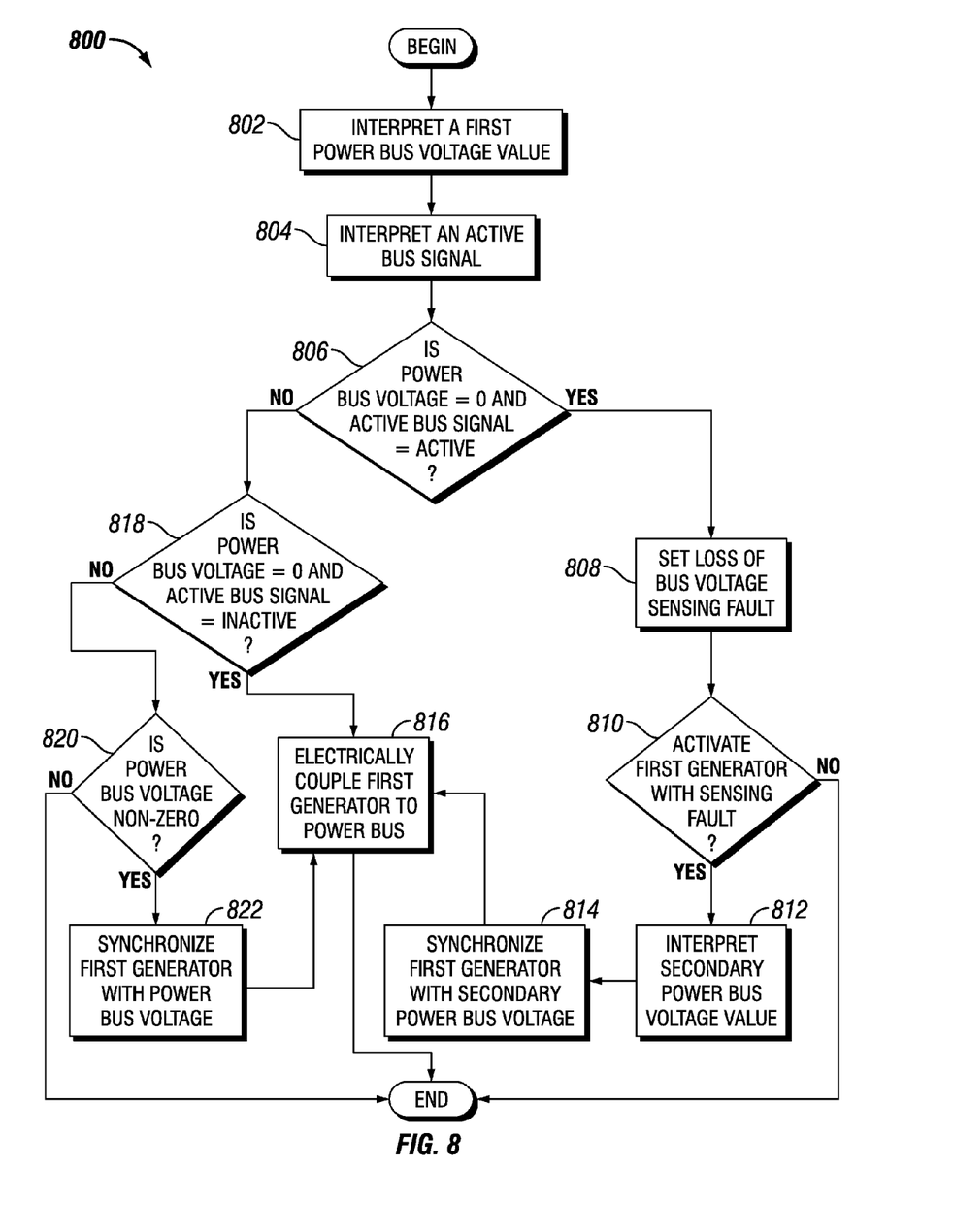
FIG. 8 is a schematic diagram of an apparatus for managing electric power generation equipment.

Referencing FIG. 8, an exemplary procedure 800 includes an operation 802 to interpret a first power bus voltage value and an operation 804 to interpret an active bus signal. The procedure 800 further includes an operation 806 to determine whether the power bus voltage is zero and the active bus signal indicates the bus is active. In response to the operation 806 indicating YES, the procedure 800 includes an operation 808 to set a loss of bus voltage sensing fault. The procedure 800 further includes an operation 810 to determine whether to activate a first generator with the bus voltage sensing fault set. The determination of whether to activate the first generator with the bus voltage sensing fault set may be a calibration, selectable by an operator, and/or defined at the time of the system manufacture.

In response to the operation 810 indicating YES, the procedure 800 includes an operation 812 to interpret a secondary power bus voltage value, and an operation 814 to synchronize the first generator with the secondary power bus voltage value. The procedure 800 further includes an operation 816 to electrically couple the first generator to the power bus, for example by closing a breaker connecting the first generator to the power bus.

In response to the operation 806 indicating NO, the procedure 800 further includes an operation 818 to determine whether the power bus voltage is zero and the active bus signal indicates the power bus is inactive. In response to the operation 818 indicating YES, the procedure 800 includes the operation 816. In response to the operation 818 indicating NO, the procedure includes an operation 820 to determine whether the power bus voltage is non-zero. In response to the operation 820 indicating YES, the procedure 800 includes an operation 822 to synchronize the first generator with the power bus voltage (e.g. amplitude, frequency, and phase) and the operation 816 to electrically couple the first generator to the power bus.

An exemplary set of embodiments for the present invention includes a system 100 including a first generator 102 having a first breaker 124 that selectively couples the first generator 102 to a common bus 118. The system 100 further includes a second generator 110 having a second breaker 126 that selectively couples the second generator 110 to the common bus 118. the system further includes a means for coupling the first generator 102 to the common bus 118 is at a zero voltage and/or at a known voltage.

Non-limiting examples of the means for coupling the first generator 102 to the common bus 118 is at a zero voltage and/or at a known voltage are described following. Certain descriptions following include reference to a controller. A controller may be a portion of a processing subsystem, including one or more computing devices having memory, processing, and communication hardware. The controller may be a single device or a distributed device, and the functions of the controller may be performed in hardware or software.

Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

A first example includes a generator controller 108 that determines a voltage of the common bus 118 from a bus voltage sensing circuit 116. Where the voltage is available from the bus voltage sensing circuit 116, the generator controller 108 provides commands to the first generator 102 to synchronize the generator with the common bus 118 voltage (e.g. voltage magnitude, frequency, and/or phase), and then provides commands to the first breaker 124 to electrically couple the first generator 102 to the common bus 118.

A second example, which may be additional or alternative to the first example, includes the generator controller 108 determining that the indicated voltage from the bus voltage sensing circuit 116 is zero and/or unavailable. The controller 108 additionally determines whether the common bus 118 is otherwise indicated as active. Exemplary operations for the controller 108 to determine whether the common bus 118 is otherwise indicated as active include interpreting communications on a system communications link 114, the communications provided by other controllers 110, 112 associated with other generators 104, 106 that indicate the common bus 118 is active.

The communications that indicate the common bus 118 is active include communications of a voltage detected on the common bus 118, for example by a second bus voltage sensing circuit 122, and/or communications that another breaker 126, 128 is presently electrically coupling one of the other generators 104, 106 to the common bus 118. The system communications link 114 may be a network or datalink structured to provide communications between the controllers 108, 110, 112, and/or the system communications link 114 may hardware portions (e.g. a second controller 110 providing a high/low voltage output according to the closed/open position of a second breaker 126), and/or the system communications link 114 may include software portions, such as when one or more of the controllers 108, 110, 112 are placed within the same computing device and a communication is passed by software parameter values or memory location values. The system 100 is illustrated with three controllers 108, 110, 112 in separate locations, but the system 100 may include any number of controllers, including two or more controllers, and the controllers may be grouped or distributed devices.

In a further description of the second example, where the controller 108 determines that the bus voltage sensing circuit 116 is zero and/or unavailable but the common bus 118 is otherwise active, the controller 108 provides a loss of bus voltage sensing fault. The system 100 operations in response to the fault may be any operations understood in the art, including without limitation providing a fault value on a datalink or network (potentially the system communications link 114, but other datalinks or networks may be present), providing a fault value to a memory location on the controller 108, lighting a lamp or other notification device, and/or providing an electronic output indication of the fault (e.g. providing a voltage or grounding a voltage on an output of the controller 108).

In a third example, which may be alternative or additional to any of the first and second example, the means for coupling the first generator 102 to the common bus 118 is at a zero voltage and/or at a known voltage further includes determining that the bus voltage sensing circuit 116 is showing zero voltage on the common bus 118, and that the common bus 118 is not otherwise indicated as active. In the third example, the controller 108 closes the first breaker 124 and thereby electrically couples the first generator 102 to the common bus 118.

In a fourth example, which may be alternative or additional to any of the first, second, and third examples, the means for coupling the first generator 102 to the common bus 118 is at a zero voltage and/or at a known voltage further includes determining a known voltage on the common bus 118 even when the bus voltage sensing fault is active. Certain embodiments include determining the known voltage on the common bus 118 through information available from the second bus voltage sensing circuit 122, for example as provided by the second controller 110 to the first controller 108 over the system communications link 114. The controller 108 provides generator commands to the first generator 102 to synchronize the first generator 102 to the known voltage, and then commands the first breaker 124 to electrically couple the first generator 102 to the common bus 118. In certain embodiments, where the controller 108 couples the first generator 102 to the common bus 118 when the bus voltage sensing fault is active, the controller 108 still performs other operations in response to the fault such as those described in the second example preceding. In certain embodiments of the fourth example, the controller 108 does not close the breaker 124 when the bus voltage sensing fault is active, and/or the controller 108 prevents the first generator 102 from electrically coupling to the common bus 118 when the bus voltage sensing fault is active.

A further exemplary system 100 includes a means for preventing coupling of the first generator 102 to the common bus 118 when the common bus 118 is at an unknown voltage. Exemplary and non-limiting means for determining when the common bus 118 is at an unknown voltage are described preceding, and non-limiting examples include determining that the bus voltage sensing circuit 116 detects a zero or unavailable voltage when an active common bus 118 is otherwise indicated. Exemplary and non-limiting means for preventing coupling of the first generator 102 include setting a DISABLE bit in software, providing an OPEN command to the first breaker 124, providing an electrical output in hardware that enforces the decoupling of the first generator 102 and the common bus 118, and performing a software operation that prevents the controller 108 from providing a command to close the first breaker 124.

A further exemplary system 100 includes a means for determining when a first voltage sensing means is in a fault condition. Exemplary means for determining when the first voltage sensing means (e.g. the first bus voltage sensing circuit 116) is in a fault condition are described as follows, without limitation. An exemplary means includes determining that the first bus voltage sensing circuit 116 indicates a zero or unavailable voltage on the common bus 118. The means further includes determining that the common bus 118 is otherwise indicated as active. Exemplary means for determining the common bus 118 is active include determining that another generator 104, 106 is presently electrically coupled to the common bus 118, and/or determining that another bus voltage sensing circuit (e.g. the second bus voltage sensing circuit 122) detects a non-zero voltage on the common bus 118.

A further exemplary system 100 includes a means for determining the known voltage on the common bus 118 when the first voltage sensing means is in the fault condition. Non-limiting examples of means for determining the known voltage on the common bus 118 when the first voltage sensing means is in the fault condition are described following. An exemplary system 100 includes the controller 108 interpreting the known voltage from another controller 110, 112, for example the second controller 110 providing a voltage from the second bus voltage sensing circuit 122, and/or interpreting the known voltage from a system model including the power output of other generators 104, 106 and power consumption of loads 120 plus losses in the system 100.

As is evident from the figures and text presented above, a variety of embodiments according to the present invention are contemplated.

An exemplary embodiment of the invention is a method including providing load sharing lines between generators operable to connect in parallel to a common bus to provide electric power from the generators. The method further includes sending one or more signals over the load sharing lines, detecting one or more responses to the one or more signals, and determining a connection status of at least one of the generators to the common bus based on the one or more responses. Certain more detailed embodiments of the method are described following.

An exemplary embodiment includes determining that none of the generators are closed to the common bus, and closing a breaker of a first one of the generators to the common bus. Another exemplary embodiment includes detecting insufficient voltage to indicate connection of one or more of the generators to the common bus, determining that at least one of the generators is closed to the common bus, and declaring a fault. Another exemplary embodiment includes measuring voltage on the common bus, where the determining of the connection status is further performed as a function of the measuring of the voltage.

Another exemplary embodiment of the invention is a method including communicating between two or more generators, the generators each being operable to connect in parallel to a common bus to provide electric power therefrom. The method further includes providing an input corresponding to bus voltage, and determining a generator connection status relative to the bus as a function of the communicating between the generators and the input corresponding to bus voltage. Certain more detailed embodiments of the method are described following.

The method further includes determining the bus is in a nonoperational state and closing a breaker of one of the generators to the bus. Another exemplary embodiment includes determining the input and the generator connection status provided by the communicating of the generator connection status are in conflict, and declaring a fault in response to the conflict.

Yet another exemplary embodiment of the invention is a method including providing a digital communications link between at least two generators, communicating the status of a power bus between the at least two generators, and communicating a breaker position of each individual generator to the at least two generators. A further embodiment of the method includes determining the at least two generators indicate that the power bus is dead, determining each individual generator has an open breaker position, and closing a breaker of one of the generators to the power bus. An additional or alternative embodiment of the method includes determining a fault condition in response to at least one of: determining that at least one generator of the at least two generators does not indicate that the power bus is dead and determining that at least one generator of the at least two generators has a closed breaker position. The method further includes, in response to the fault condition, preventing a first generator from closing a breaker to the power bus and declaring a fault. Yet another exemplary method includes determining the fault condition further in response to a controller for the first generator indicating that the power bus is dead.

Yet another embodiment of the invention is a method including interpreting a first power bus voltage value and interpreting an active bus signal. The method includes, in response to the first power bus voltage value indicating a power bus voltage value is zero and the active bus signal indicating the power bus is active, providing a loss of bus voltage sensing fault. More detailed embodiments of the method are described as follows.

A further embodiment includes, in response to the first power bus voltage value indicating a power bus voltage value is zero and the active bus signal indicating the power bus is inactive, electrically coupling a first generator to the power bus. Yet another embodiment includes, in response to the loss of bus voltage sensing fault, preventing an electrical coupling of a first generator and the power bus. Another exemplary method includes, in response to the first power bus voltage value indicating the power bus voltage value is not zero, synchronizing a first generator with the power bus voltage value then electrically coupling the first generator to the power bus. Yet another exemplary method includes, in response to the loss of bus voltage sensing fault, interpreting a secondary power bus voltage value, synchronizing a first generator with the secondary power bus voltage value, then electrically coupling the first generator to the power bus.

Yet another exemplary set of embodiments of the invention include an apparatus having a first bus voltage sensing module that interprets a first power bus voltage value, a system communications module that interprets an active bus signal, and a bus voltage fault module that, in response to the first power bus voltage value indicating a power bus voltage value is zero and the active bus signal indicating the power bus is active, provides a loss of bus voltage sensing fault. Certain more detailed embodiments of the apparatus are described as follows.

A further embodiment of the apparatus includes a generator control module that, in response to the first power bus voltage value indicating a power bus voltage value is zero and the active bus signal indicating the power bus is inactive, electrically couples a first generator to the power bus. A still further embodiment includes the generator control module, in response to the loss of bus voltage sensing fault, further preventing an electrical coupling of the first generator and the power bus.

Another exemplary apparatus includes the generator control module, in response to the first power bus voltage value indicating the power bus voltage value is not zero, synchronizing a first generator with the power bus voltage value, then electrically coupling the first generator to the power bus. Yet another exemplary apparatus includes the system communications module, in response to the loss of bus voltage sensing fault, further interpreting a secondary power bus voltage value, and the generator control module further synchronizing a first generator output with the secondary power bus voltage value and electrically coupling the first generator to the power bus. An exemplary apparatus includes the active bus signal being a secondary power bus voltage value and/or a second generator coupling signal.

While the invention has been illustrated and described in detail in the drawings and foregoing description, the same is to be considered as illustrative and not restrictive in character, it being understood that only the selected embodiments have been shown and described and that all changes, modifications and equivalents the come within the spirit of the inventions as defined herein are desired to be protected. It is intended that when words such as "a," "an," "at least one," and singulars are used there is no intention of limitation to only one item unless specifically stated to the contrary.

Other inventions include redundant means of dead bus detection including utilizing additional breaker positions to determine the status of a bus, and utilizing an external discrete switch input to determine the status of a bus. Further embodiments, inventions, forms, objects, features, advantages, aspects, and benefits of the present application are otherwise set forth or become apparent from the description and drawings included herein.

The invention claimed is:

1. A method, comprising:
   providing load sharing lines between generators operable to connect in parallel to a common bus to provide electric power from the generators;
   sending one or more signals over the load sharing lines;
   detecting one or more responses to the one or more signals;
   determining a connection status of at least one of the generators to the common bus based on the one or more responses;
   detecting insufficient voltage to indicate connection of one or more of the generators to the common bus;
   determining that at least one of the generators is closed to the common bus; and
   declaring a fault.

2. The method of claim 1, further comprising determining that none of the generators are closed to the common bus and closing a breaker of a first one of the generators to the common bus.

3. The method of claim 1, which includes measuring voltage on the common bus, wherein the determining of the connection status is further performed as a function of the measuring of the voltage.

4. A method, comprising:
communicating between two or more generators, the generators each being operable to connect in parallel to a common bus to provide electric power therefrom;
providing an input corresponding to bus voltage;
determining a generator connection status relative to the bus as a function of the communicating between the generators and the input corresponding to bus voltage;
determining the input and the generator connection status provided by the communicating of the generator connection status are in conflict; and
declaring a fault in response to the conflict.

5. The method of claim 4, which includes determining the bus is in a nonoperational state and closing a breaker of one of the generators to the bus.

6. A method, comprising:
providing a digital communications link between at least two generators,
communicating the status of a power bus between the at least two generators,
communicating a breaker position of each individual generator to the at least two generators;
determining a fault condition in response to at least one of:
determining that at least one generator of the at least two generators does not indicate that the power bus is dead;
determining that at least one generator of the at least two generators has a closed breaker position; and
in response to the fault condition, preventing a first generator from closing a breaker to the power bus and declaring a fault.

7. The method of claim 6, further comprising:
determining the at least two generators indicate that the power bus is dead;
determining each individual generator has an open breaker position; and
closing a breaker of one of the generators to the power bus.

8. The method of claim 6, which further includes determining the fault condition further in response to a controller for the first generator indicating that the power bus is dead.

9. A method, comprising:
interpreting a first power bus voltage value;
interpreting an active bus signal; and
in response to the first power bus voltage value indicating a power bus voltage value is zero and the active bus signal indicating the power bus is active, providing a loss of bus voltage sensing fault.

10. The method of claim 9, further comprising, in response to the first power bus voltage value indicating a power bus voltage value is zero and the active bus signal indicating the power bus is inactive, electrically coupling a first generator to the power bus.

11. The method of claim 9, further comprising, in response to the loss of bus voltage sensing fault, preventing an electrical coupling of a first generator and the power bus.

12. The method of claim 9, further comprising, in response to the first power bus voltage value indicating the power bus voltage value is not zero, synchronizing a first generator with the power bus voltage value then electrically coupling the first generator to the power bus.

13. The method of claim 9, further comprising, in response to the loss of bus voltage sensing fault, interpreting a secondary power bus voltage value, synchronizing a first generator with the secondary power bus voltage value, then electrically coupling the first generator to the power bus.

14. An apparatus, comprising:
a first bus voltage sensing module structured to interpret a first power bus voltage value;
a system communications module structured to interpret an active bus signal; and
a bus voltage fault module structured to, in response to the first power bus voltage value indicating a power bus voltage value is zero and the active bus signal indicating the power bus is active, provide a loss of bus voltage sensing fault.

15. The apparatus of claim 14, further comprising a generator control module structured to, in response to the first power bus voltage value indicating a power bus voltage value is zero and the active bus signal indicating the power bus is inactive, electrically couple a first generator to the power bus.

16. The apparatus of claim 15, wherein the generator control module is further structured to, in response to the loss of bus voltage sensing fault, prevent an electrical coupling of the first generator and the power bus.

17. The apparatus of claim 14, wherein the generator control module is further structured to, in response to the first power bus voltage value indicating the power bus voltage value is not zero, synchronize a first generator with the power bus voltage value then electrically coupling the first generator to the power bus.

18. The apparatus of claim 14, wherein the system communications module is further structured to, in response to the loss of bus voltage sensing fault, interpret a secondary power bus voltage value, and wherein the generator control module is further structured to synchronize a first generator output with the secondary power bus voltage value, then electrically couple the first generator to the power bus.

19. The apparatus of claim 14, wherein the active bus signal comprises one of a secondary power bus voltage value and a second generator coupling signal.

20. A system, comprising:
a first generator having a first breaker structured to selectively couple the first generator to a common bus;
a second generator having a second breaker structured to selectively couple the second generator to the common bus; and
a means for coupling the first generator to the common bus when the common bus is at one of a zero voltage and a known voltage;
a controller connected to at least one of the first and second generators and the common bus, the controller being configured to interpret a common bus voltage value of the common bus and an active bus signal of the common bus, wherein, in response to the common bus voltage value indicating the common bus voltage value is zero and the active bus signal indicating the power bus is active, the controller is configured to provide a loss of bus voltage sensing fault.

21. The system of claim 20, further comprising a means for preventing coupling of the first generator to the common bus when the common bus is at an unknown voltage.

22. The system of claim 20, wherein the loss of bus voltage sensing fault indicates that a first voltage sensor in the connection between the controller and the common bus is in a fault condition.

23. The system of claim 22, further comprising means for determining the known voltage of the common bus when the first voltage sensor is in the fault condition.

\* \* \* \* \*